US005786930A

United States Patent [19]

Takatsu et al.

[11] Patent Number: 5,786,930
[45] Date of Patent: Jul. 28, 1998

[54] OPTICAL FREQUENCY SWEEP SIGNAL GENERATOR

[75] Inventors: Tatsuhiko Takatsu, Tokyo; Kazuo Aida, Yokohama; Kiyoshi Nakagawa, Miura-gun, all of Japan

[73] Assignees: Ando Electric Co., Ltd.; Nippon Telegraph and Telephone Corporation, both of Tokyo, Japan

[21] Appl. No.: 785,844

[22] Filed: Jan. 24, 1997

[30] Foreign Application Priority Data

Jan. 25, 1996 [JP] Japan ................... 8-011233

[51] Int. Cl.$^6$ ....................................... H01S 3/13
[52] U.S. Cl. ................ 359/331; 250/227.27; 372/32; 372/38
[58] Field of Search ................ 359/326–332; 356/345, 349, 350; 372/29, 32, 38; 250/227.19, 227.27

[56] References Cited

U.S. PATENT DOCUMENTS 4,883,963 11/1989 Kemeny et al. .......... 250/339.11
5,548,402 8/1996 Nogiwa ..................... 356/349

*Primary Examiner*—John D. Lee
*Attorney, Agent, or Firm*—Finnegan, Henderson, Farabow, Garrett & Dunner, L.L.P.

[57] ABSTRACT

An optical frequency sweep signal generator using an optical frequency variable bandpass filter which can be practically used is provided. The optical frequency sweep signal generator comprises: a circulation control circuit for generating a first electric signal which indicates the start and the end of a sweep; an optical loop circuit; an optical frequency variable bandpass filter, provided in the loop circuit, for suppressing circulation of natural emission light output from an optical amplifier; a light receiving element for converting a part of light output from the optical loop circuit into a second electric signal; a sweep signal analyzing circuit for outputting a set value for compensating for a difference between the center frequency of the optical frequency variable bandpass filter and the optical frequency of the pulsed light based on the first and second electric signals; and a driving circuit for supplying a driving signal for determining the center frequency of the optical frequency variable bandpass filter to the optical frequency variable bandpass filter, based on the first electric signal and the set value.

1 Claim, 12 Drawing Sheets

5,786,930

OPTICAL FREQUENCY SWEEP SIGNAL GENERATOR

BACKGROUND OF THE INVENTION

1. Field of the Invention

The present invention relates to an optical frequency sweep signal generator which comprises an acousto-optical frequency shifter in an optical loop circuit. This application is based on patent application No. Hei8-011233 filed in Japan, the content of which is incorporated herein by reference.

2. Description of the Related Art

The concept of conventional optical frequency sweep signal generators will be explained with reference to FIG. 16. In FIG. 16, reference numeral 100 indicates an optical loop circuit which establishes an optical path of loop form, and which causes input light from the outside to circulate along the optical path. In the optical frequency sweep signal generator shown in FIG. 16, at the start of circulation, circulation control circuit 21 operates optical switch 2 by using control signal 21a. Continuous light, which is introduced from single-wavelength light source 1, is transformed into pulsed light whose pulse width is shorter than a period necessary for one circuit of the optical loop circuit 100, and is input into acousto-optical frequency shifter 3 of optical loop circuit 100.

Here, two functions of acousto-optical frequency shifter 3 will be explained. One of them is a function as an optical switch. If control signal 21b is not supplied from circulation control circuit 21 to acousto-optical frequency shifter 3, optical waveguides 3a and 3c are optically connected to each other. In contrast, when control signal 21b is supplied to acousto-optical frequency shifter 3, optical waveguides 3b and 3c are optically connected to each other.

If control signal 21b is supplied, acousto-optical frequency shifter 3 realizes an optical frequency shifting function which is the other of said two functions. This function is such that the optical frequency of an optical signal is shifted by a specific frequency while the optical signal is input from optical waveguide 3b and is output to optical waveguide 3c.

Since control signal 21b is not supplied from circulation control circuit 21 at the start of circulation, acousto-optical frequency shifter 3 is connected to the optical waveguide 3a side. The acousto-optical frequency shifter 3 inputs pulsed light via optical waveguide 3c to optical coupler 4.

The optical coupler 4 splits the input pulsed light into two paths, that is, outputs a part of the input pulsed light to optical output end 9, and outputs the remaining part to delay optical fiber 5. The pulsed light which was split by optical coupler 4 and output to optical output end 9 is further output from the output end 9 to the outside.

The pulsed light which was split by optical coupler 4 and output to delay optical fiber 5 is delayed in delay optical fiber 5 by a predetermined time and is then input into optical amplifier 6. The optical amplifier 6 is set up to optically amplify input pulsed light so as to fix the optical energy in the optical loop circuit. The pulsed light, which was optically amplified in optical amplifier 6, is then input via optical waveguide 3b into acousto-optical frequency shifter 3.

In a period in which the pulsed light, which was made by chopping by optical switch 2, makes one circuit of the optical loop circuit 100 and returns to acoustooptical frequency shifter 3, circulation control circuit 21 outputs control signal 21b. The acousto-optical frequency shifter 3, which is driven by control signal 21b, changes its connection form of optical waveguides such that optical waveguide 3c and optical waveguide 3b are connected to each other, and the frequency shifter 3 also subjects the pulsed light to a predetermined frequency shift.

The pulsed light, whose frequency was shifted in the acousto-optical frequency shifter 3, is input into optical coupler 4. The pulsed light input into optical coupler 4 continuously circulates along the optical loop circuit 100 by repeating the above operation. The pulsed light circulating the optical loop circuit 100 accepts a predetermined frequency shift by acousto-optical frequency shifter 3 for each circuit of circulation. Additionally, a part of the pulsed light which circulates along the optical loop circuit 100 is isolated by optical coupler 4 and output from optical output end 9.

The pulsed light output from optical output end 9 becomes an optical pulse train in which the optical frequency is shifted for each pulse (in the figure, step-formed characteristic lines), as shown in FIG. 17. Here, the horizontal axis in FIG. 17 indicates the elapsed time from the start of circulation, while the vertical axis indicates the optical frequency of the pulsed light output from optical output end 9. The most left step in the step-formed characteristic lines corresponds to pulsed light which is output from single-wavelength light source 1 at the start of circulation, and is directly output from optical output end 9 via optical switch 2, acousto-optical frequency shifter 3, and optical coupler 4.

The second step from the left side of the step-formed characteristic lines corresponds to pulsed light which makes one circuit of the optical loop circuit 100, and is isolated by optical coupler 4 and is input into optical output end 9. That is, the difference between the two adjacent steps of the step-formed characteristic lines shown in FIG. 17 indicates an amount of the frequency shift ($\Delta f$) performed by acousto-optical frequency shifter 3. Here, the optical pulse train whose optical frequency is shifted by a predetermined frequency, as shown in FIG. 17, is defined as an optical frequency sweep signal.

On the other hand, the pulsed light was made by chopping of light into pulses whose pulse width is shorter than a period necessary for one circuit of the optical loop circuit 100, by optical switch 2 at the start of circulation. Therefore, the optical frequency sweep signal output from optical output end 9 becomes an optical pulse train whose period corresponds to the one-circuit time with respect to optical loop circuit 100. Since the optical frequency of the single-wavelength light source 1 and the shift frequency with respect to acousto-optical frequency shifter 3 are known, the optical frequency of each pulsed light of the optical frequency sweep signal can be calculated by counting the number of pulses of the optical frequency sweep signal.

At the end of the circulation, circulation control circuit 21 cuts off the control signal 21b. The acousto-optical frequency shifter 3 changes its connection form of optical waveguides such that optical waveguide 3a and optical waveguide 3c are optically connected to each other. In this way, optical loop circuit 100 is cut off. When the loop of optical loop circuit 100 is cut off, the pulsed light which remains in optical loop circuit 100 cannot further circulate and thus disappears. Therefore, the circulation operation ends according to the cut-off operation of optical loop circuit 100 by acousto-optical frequency shifter 3. Here, "one sweep" is defined as a sweep operation from the start of the present circulation to the start of the next circulation.

In the optical loop circuit 100 as shown in FIG. 16, natural emission light having a wide wave band is generated by optical amplifier 6. The natural emission light is generated when a rare earth element, which is employed for the optical amplification function of the optical amplifier 6, is in an excited state; thus, it can be regarded as white noise light having a fixed light intensity over a band wider than a sweep frequency range of the optical frequency sweep signal generator.

The natural emission light is accumulated for each circuit of the pulsed light along optical loop circuit 100, and is increased. When the rate of natural emission light with respect to the pulsed light is increased, information regarding the optical frequency of the pulsed light included in the optical frequency sweep signal cannot be detected. In addition, if information regarding the optical frequency of the pulsed light cannot be used, it is valueless to continue circulation.

As described above, in the optical loop circuit 100, the number of circuits of the pulsed light whose optical frequency information is usable is limited by the natural emission light. Therefore, there occurs a problem in that a wide-range optical frequency sweep operation cannot be performed.

As optical energy which circulates along the optical loop circuit 100, there are two kinds of optical signals such as pulsed light and natural emission light. The optical amplifier 6 is operated such that the intensity of light obtained by synthesis of pulsed light and natural emission light is fixed. In addition, since natural emission light is accumulated for each circuit, if the level of amplification of optical amplifier 6 is set up such that the circulation loss of optical loop circuit 100 becomes zero, the total intensity of the energy of light which circulates along optical loop circuit 100 increases for each circuit by an increased level of the accumulation with respect to the natural emission light.

Therefore, in order to maintain the total intensity of light which circulates along optical loop circuit 100, the amplification level of optical amplifier 6 with respect to the pulsed light is set up to be a little smaller than the amplification level by which the circulation loss of optical loop circuit 100 becomes zero. Since the pulsed light is not accumulatively increased during circulation, the pulsed light suffers a circulation loss corresponding to a lowered amount of the optical amplification level of optical amplifier 6. According to the circulation loss, the pulsed light is attenuated for each circuit, and soon disappears. In optical loop circuit 100 in which the pulsed light has disappeared, natural emission light circulates with a fixed light intensity.

In FIG. 18, a simulation example of an optical frequency sweep signal, which is output from optical output end 9 in FIG. 16, is shown. In FIG. 18, the horizontal axis indicates an elapsed time from the start of the sweep operation, the vertical axis indicates the intensity of light output from optical output end 9. According to FIG. 18, it can be understood that the optical frequency sweep signal consists of pulsed light and natural emission light, and the pulsed light is attenuated according to the increase of natural emission light. On the other hand, the light intensity of the pulsed light at about the start of the sweep is larger than the light intensity of the progressing part in the circulation, which includes only natural emission light. This is because optical amplifier 6 is operated in a manner such that the average of the total intensity of the optical energy which circulates along optical loop circuit 100 becomes fixed; thus, if the pulsed-light part is averaged, it can be understood that the result corresponds to the optical intensity of the part including only natural emission light, this part appears in the progress of the circulation.

As described above, in the arrangement shown in FIG. 16, the number of circuits for circulation is limited due to the increase of natural emission light from optical amplifier 6. As a solution of this problem, there is a method in which bandpass filter 31 of a fixed optical frequency band is positioned at the output side of the optical amplifier 6, as shown in FIG. 19. As described above, natural emission light output from optical amplifier 6 is generated over an optical frequency range wider than the optical frequency sweep range of the optical frequency sweep signal. Therefore, this method is such that natural emission light belonging to the range outside of the optical frequency sweep range is attenuated by placing optical frequency fixed variable bandpass filter 31 after optical amplifier 6. According to this method, it is possible to attenuate natural emission light belonging to unnecessary wave bands and to decrease the light intensity of the whole of natural emission light. Therefore, the accumulated and added amount with respect to the natural emission light for each circuit is decreased by the size of the decrease in the light intensity of the whole of the natural emission light; thus, the limitation for the number of circuits for circulation is eased.

The results of a simulation in which an optical frequency fixed bandpass filter having a square-form light-passing characteristic is used as optical frequency fixed bandpass filter 31 will be shown in FIGS. 20 and 21. The reason for using the optical frequency fixed bandpass filter having a virtual light-passing characteristic of such square form is to make it intuitive and easy to understand the effect caused by the difference with respect to the band of the optical frequency fixed bandpass filter.

FIG. 20 shows the results of a simulation in which an optical frequency fixed bandpass filter having a wide band width is used, and FIG. 20 is a graph of the same form as FIG. 18. However, in FIG. 20, the light-passing characteristic of the optical frequency fixed bandpass filter is also shown. Regarding the horizontal axis of FIG. 20, the optical frequency and the time, which may seem unrelated to each other, are shown on the same axis. This is because it is necessary to show a relationship between the optical frequency of the pulsed light and the light-passing characteristic of the optical frequency fixed bandpass filter.

Hereinbelow, FIG. 20 will be explained in detail. In the figure, a characteristic line indicated by reference symbol P1 shows a relationship between the elapsed time from the start of the sweep and the light intensity of the pulsed light, while a characteristic line indicated by reference symbol C1 indicates a relationship between the optical frequency of the pulsed light and the light-passing characteristic of the optical frequency fixed bandpass filter (in FIGS. 21 and 22 described later, reference symbols P2, C2, and P3, C3 are used instead of P1 and C1, respectively).

As described above, the optical frequency of the pulsed light shifts discretely. However, regarding the horizontal axis in FIG. 20, the axis relating to the elapsed time from the sweep start and the axis of the optical frequency of the pulsed light agree with each other at a position immediately after each rise in the pulsed light. That is, the optical frequencies of the light-passing characteristic of the optical frequency fixed bandpass filter and the pulsed light have one axis in common, and the position at each rise in pulsed light on the horizontal axis also shows the relevant optical frequency of the pulsed light. Therefore, according to FIG. 20, it is easy to judge whether the pulsed light exists in the passing range of the optical frequency fixed bandpass filter or not.

On the other hand, the vertical axis in FIG. 20 indicates the light intensity of the output of the optical frequency sweep signal and the light-passing characteristic of the optical frequency fixed bandpass filter. Here, the sweep start time is located at the left end on the horizontal axis; thus, the left end of the passing characteristic of the optical frequency fixed bandpass filter agrees with the position of the vertical axis. In the results of the simulation as shown in FIG. 20, the increase in natural emission light is suppressed, and the effective number of circuits for circulation is increased in comparison with the results shown in FIG. 18. However, at the right end of the light-passing band of the optical frequency fixed bandpass filter in FIG. 20, the pulsed light is greatly attenuated. Therefore, it is very difficult to read optical frequency information.

FIG. 21 shows the results of a simulation in which an optical frequency fixed bandpass filter having a narrow band width is used, where the same form as that used in FIG. 20 is adopted. Here, the band width of the optical frequency fixed bandpass filter of FIG. 21 is one second of the band width of the optical frequency fixed bandpass filter as shown in FIG. 20. In the results of the simulation as shown in FIG. 21, the increase of natural emission light is suppressed, and the effective number of circuits for circulation is increased in comparison with the results shown in FIG. 20. However, at the right end of the light-passing band of the optical frequency fixed bandpass filter in FIG. 21, the pulsed light has disappeared. Such disappearance of the pulsed light occurred because the optical frequency of the pulsed light shifts outside of the light-passing band of the optical frequency fixed bandpass filter, and thus the passing loss of the optical frequency fixed bandpass filter becomes infinite; thus, the pulsed light can no longer circulate along the optical loop circuit. In addition, in FIG. 21, the pulsed light of one circuit prior to the disappearance has light intensity sufficient for reading optical frequency information.

By comparing FIGS. 18, 20, and 21, it can be understood that the number of circuits for circulation can be increased by locating optical frequency fixed bandpass filter 31 after optical amplifier 6, as shown in FIG. 19. However, as clearly shown by the results of the simulation of FIG. 20, in the case in which an optical frequency fixed bandpass filter with a band width wider than a certain degree is used, the intensity of natural emission light becomes large; thus, the pulsed light is attenuated before the optical frequency reaches the boundary of the light-passing band of the optical frequency fixed bandpass filter. In contrast, in the case of using the optical frequency fixed bandpass filter with a band width narrower than a certain degree (as shown in FIG. 21), the intensity of the natural emission light becomes small; thus, the amount of attenuation of the pulsed light also becomes small. However, the pulsed light soon disappears due to the limitation of the light-passing band of the optical frequency fixed bandpass filter before the pulsed light becomes significantly attenuated. Therefore, in an optical frequency sweep signal generator using optical frequency fixed bandpass filter 31, there is an optimum condition at which the optical frequency sweep width becomes maximum. In other words, in an optical frequency sweep signal generator employing optical frequency fixed bandpass filter 31, it is impossible to perform a wide band optical frequency sweep having conditions superior than the optimum conditions.

In order to solve the above described problem, an optical frequency variable bandpass filter may be used instead of optical frequency fixed bandpass filter 31. Specifically, the center frequency of an optical frequency variable bandpass filter is shifted in conformity with the frequency shift of the pulsed light. When the center frequency of an optical frequency variable bandpass filter is also shifted while maintaining the same optical frequency as that of the pulsed light, the pulsed light is not subjected to limitation with respect to the light-passing band of the optical frequency variable bandpass filter. In this case, it is possible to make the band width of the optical frequency variable bandpass filter extremely narrow because the pulsed light is not subjected to limitation with respect to the light-passing band of the optical frequency variable bandpass filter; therefore, light intensity of natural emission light can be made small. Therefore, it is possible to make the amount of attenuation of the pulsed light small, and thus the number of circuits for circulation can be increased.

FIG. 22 shows the results of a simulation in which a method which uses an optical frequency variable bandpass filter instead of optical frequency fixed-band filter 31 is adopted in the optical frequency sweep signal generator. The simulation results shown in FIG. 22 were obtained by using an optical frequency variable bandpass filter having a band width of one tenth of the band width of the optical frequency fixed bandpass filter which was used for obtaining the results of the simulation shown in FIG. 20. FIG. 22 is also drawn by using the same format as FIG. 20. In addition, in the light-passing characteristic as shown in FIG. 22, the frequency is shifted in accordance with the frequency shift of the pulsed light; however, in order to compare the results shown in FIGS. 20 and 21, only the light-passing characteristic at a certain time is shown.

The results of the simulation as shown in FIG. 22 indicates that the increase in natural emission light is suppressed in comparison with the results as shown in FIG. 20. FIG. 22 also shows that the pulsed light has sufficient light intensity for reading optical frequency information even at the right end in the figure. Therefore, if the sweep operation is performed by conforming the center frequency of the optical frequency variable bandpass filter to the optical frequency of the pulsed light, it is possible to greatly expand the optical frequency sweep range of the optical frequency sweep signal.

According to the simulation results described above, it became obvious that an optical frequency sweep signal generator using an optical frequency variable bandpass filter is effective for increasing the number of circuits (for circulation) of the pulsed light. However, it is not easy to cause pulsed light to circulate in the optical frequency sweep signal generator using an optical frequency variable bandpass filter because the center frequency of the optical frequency variable bandpass filter is easy to vary according to temperature, and long-term stability is not good.

If it is assumed that the center frequency of the optical frequency variable bandpass filter is not affected by temperature and long-term stability is good, it is possible to realize an optical frequency sweep signal generator for generating an optical frequency sweep signal which sweeps over a wide band corresponding to a large number of circuits if a relationship between the center frequency and the driving signal of the optical frequency variable bandpass filter is previously defined by using another device, and if the optical frequency variable bandpass filter is driven based on this relationship.

However, because of the above problem, such an optical frequency variable bandpass filter has never been realized. Therefore, for shifting the center frequency of the optical frequency variable bandpass filter in conformity with the frequency shift of the pulsed light, it is necessary to perform the sweep by measuring the center frequency of the optical frequency variable bandpass filter at any time and to feed it back to the driving signal of the optical frequency variable bandpass filter, so as to tune the center frequency to the optical frequency of the pulsed light.

However, the pulsed light is circulating in the optical loop circuit; thus, it is impossible to input another signal for measuring the center frequency of the optical frequency variable bandpass filter (located within the optical loop circuit) into the optical loop circuit.

As described above, the center frequency of the optical frequency variable bandpass filter cannot be swept in synchronism with the optical frequency of the pulsed light. Therefore, in spite of the fact that the effectiveness of the method has been indicated based on the simulation, an optical frequency sweep signal generator using the optical frequency variable bandpass filter has never been realized.

SUMMARY OF THE INVENTION

The present invention has been made in consideration of the above-explained circumstances, and it is an object of the present invention to provide an optical frequency sweep signal generator using an optical frequency variable bandpass filter which can be practical use.

Therefore, the present invention provides an optical frequency sweep signal generator comprising: a circulation control circuit for generating a first electric signal which indicates the start and the end of a sweep; an optical switch for converting continuous light output from a single-wavelength light source into pulsed light based on the first electric signal; an optical loop circuit having an optical loop path along which the pulsed light circulates; an acousto-optical frequency shifter, inserted in the optical loop path, for introducing the pulsed light into the optical loop path and for shifting the optical frequency of the pulsed light which circulates along the optical loop path by a predetermined optical frequency, based on the first electric signal; first light branch means, inserted in the optical loop path, for splitting the pulsed light which circulates along the optical loop path and for outputting one of the split pulsed light to the outside of the optical loop circuit; a delay optical fiber, inserted in the optical loop path, for delaying the other of said split pulsed light output form the first light branch means so as to adjust a circulation time of the pulsed light; an optical amplifier, inserted in the optical loop path, for amplifying light which circulates along the optical loop path, the light including natural emission light, so as to compensate for circulation loss; an optical frequency variable bandpass filter for suppressing circulation of the natural emission light output from the optical amplifier; second light branch means for splitting said one of the split pulsed light output from the first light branch means; an optical output end for outputting one of the split pulsed light output form the second light branch means as an optical frequency sweep signal; a light receiving element for converting the other of the split pulsed light output from the second light branch means into a second electric signal, and for outputting the converted signal; a sweep signal analyzing circuit for detecting a difference between the center frequency of the optical frequency variable bandpass filter and the optical frequency of the pulsed light which circulates along the optical loop path based on the first and second electric signals, and for outputting a set value for compensating for the difference; and a driving circuit for supplying a driving signal for determining the center frequency of the optical frequency variable bandpass filter to the optical frequency variable bandpass filter, based on the first electric signal and the set value.

According to this invention, an optical frequency sweep signal generator using an optical frequency variable bandpass filter which can be practically used can be provided; thus, it is possible to generate an optical frequency sweep signal having a wide frequency range based on a large number of circuits.

9

Figure 18:
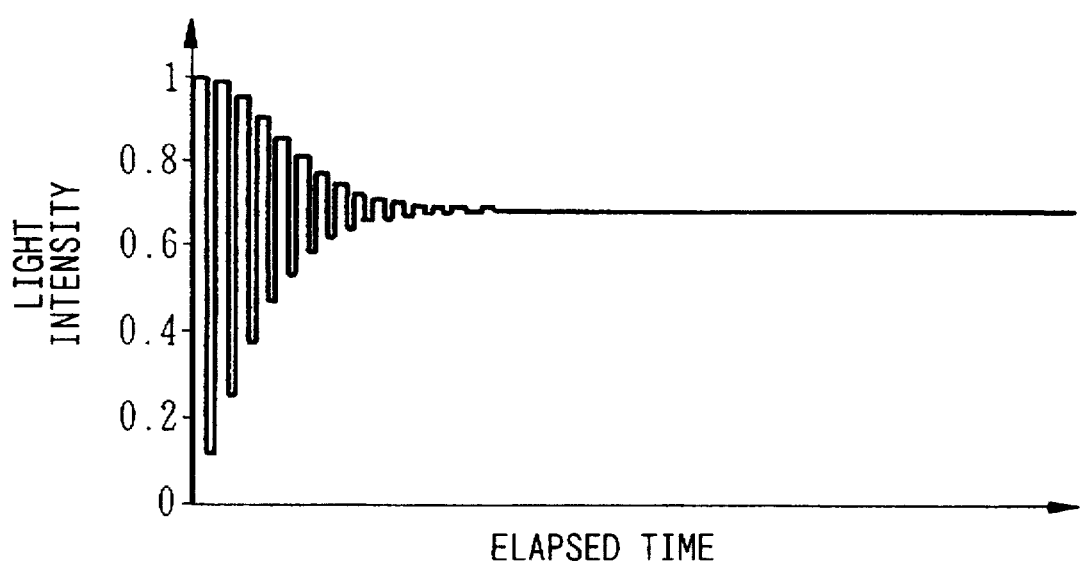

FIG. 18 is a diagram showing the results of a simulation with respect to the optical frequency sweep output according to the conventional optical frequency sweep signal generator.

Figure 19:
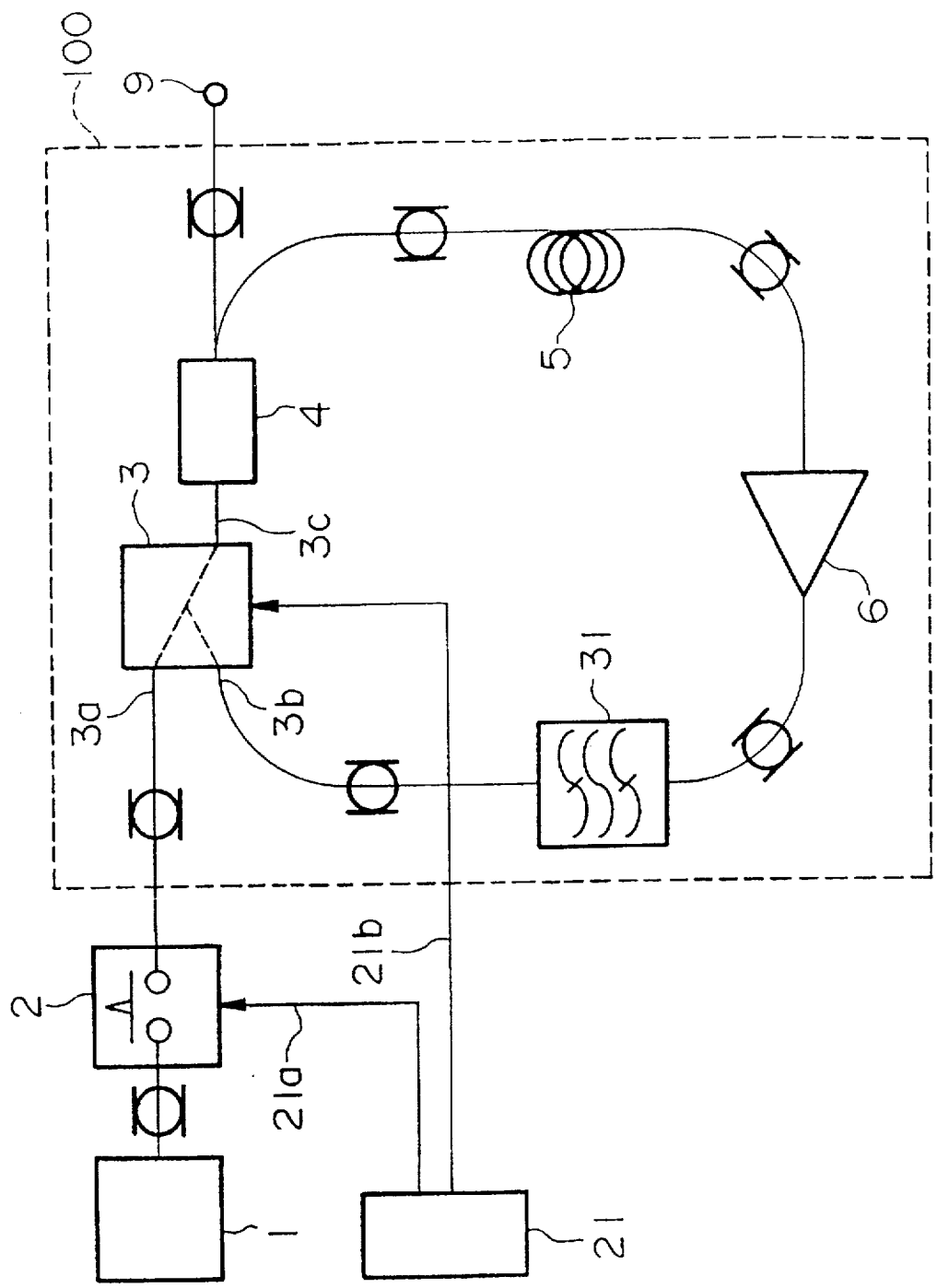

FIG. 19 is a block diagram showing the structure of a conventional optical frequency sweep signal generator using a conventional optical frequency fixed bandpass filter.

Figure 20:
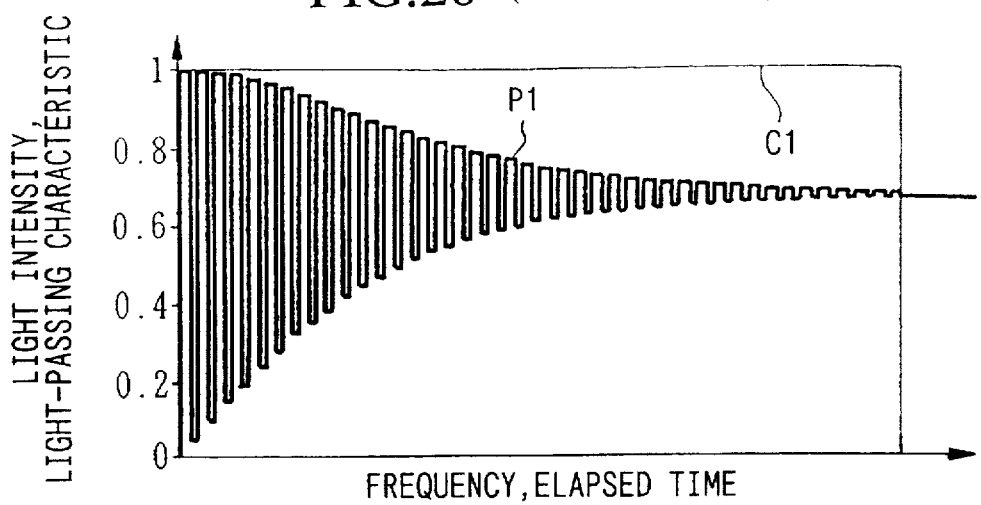

FIG. 20 is a diagram showing the results of a simulation with respect to the optical frequency sweep output according to the generator of FIG. 19.

Figure 21:
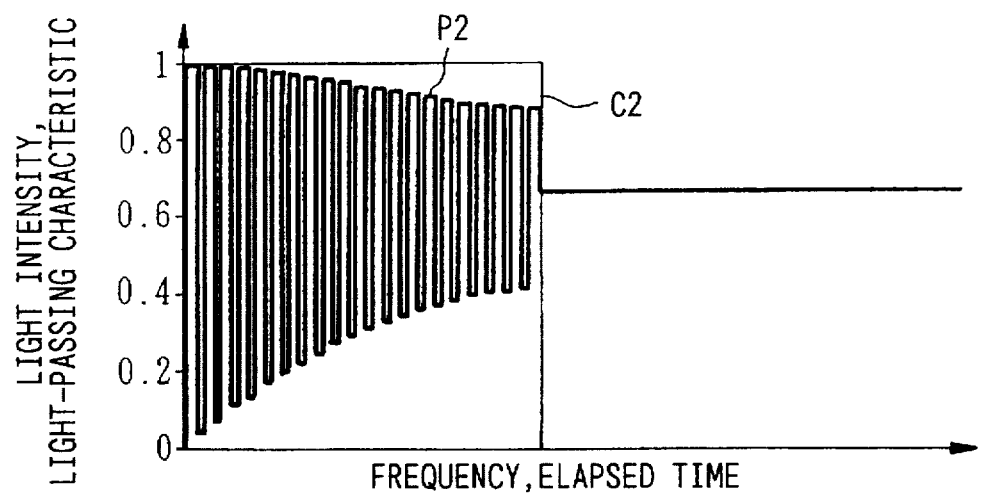

FIG. 21 is a diagram showing the results of a simulation with respect to the optical frequency sweep output according to the generator of FIG. 19.

Figure 22:
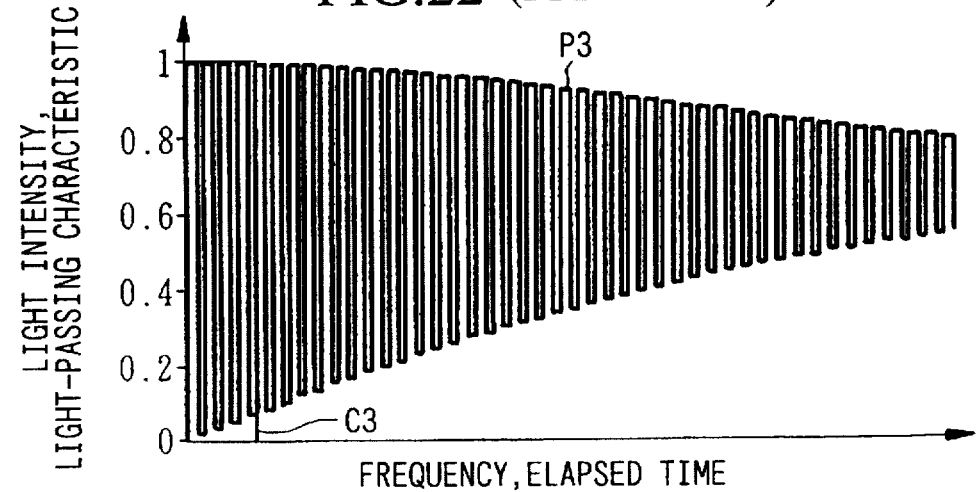

FIG. 22 is a diagram showing the results of a simulation with respect to the optical frequency sweep output according to the generator of FIG. 19, in the case of using an optical frequency variable bandpass filter having a narrow band.

DESCRIPTION OF THE PREFERRED EMBODIMENTS

Hereinbelow, preferred embodiments of the present invention will be explained with reference to the drawings.

Figure 1:
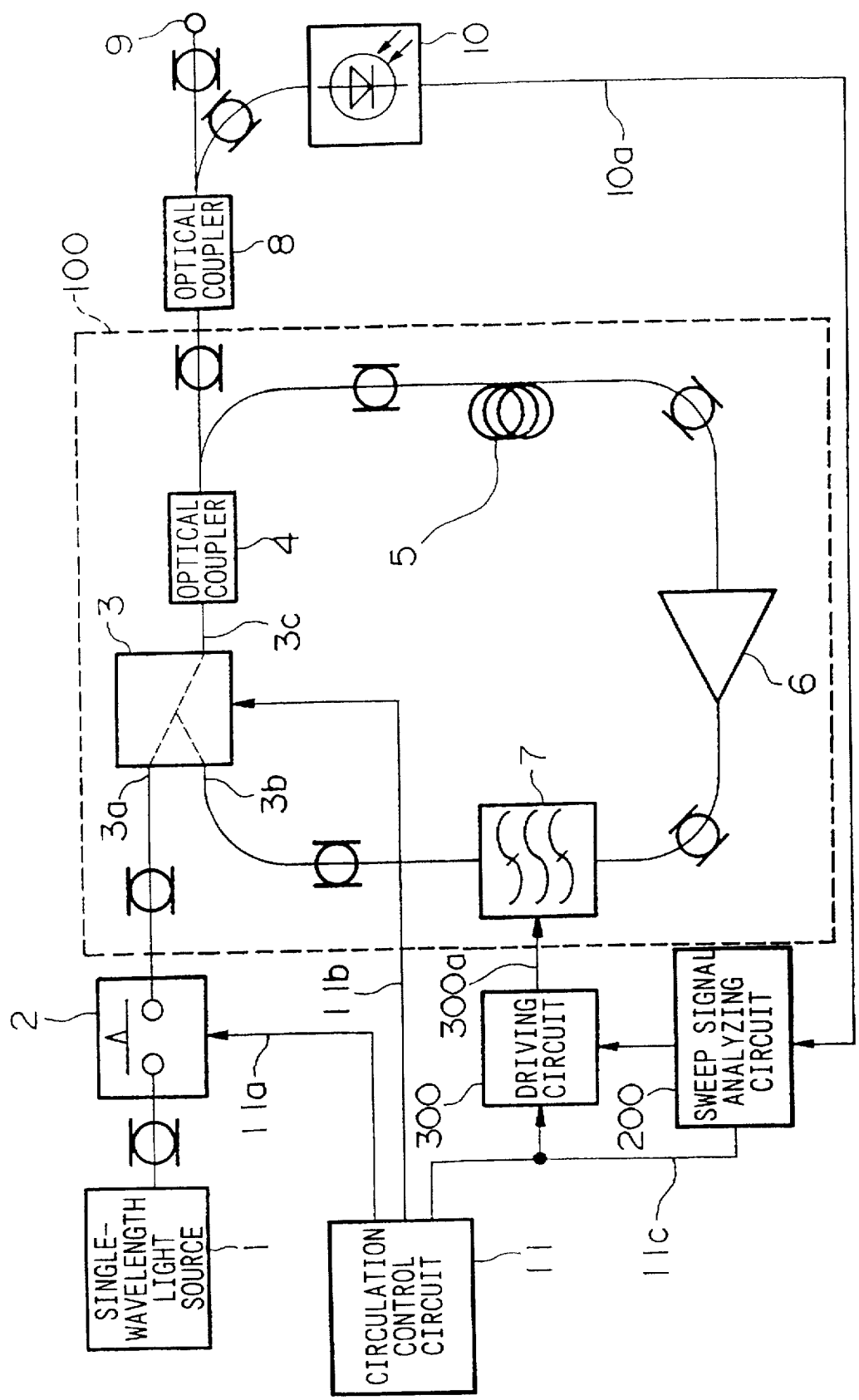
FIG. 1 is a block diagram showing the whole common structure of the optical frequency sweep signal generator in each embodiment according to the present invention.
Figure 16:
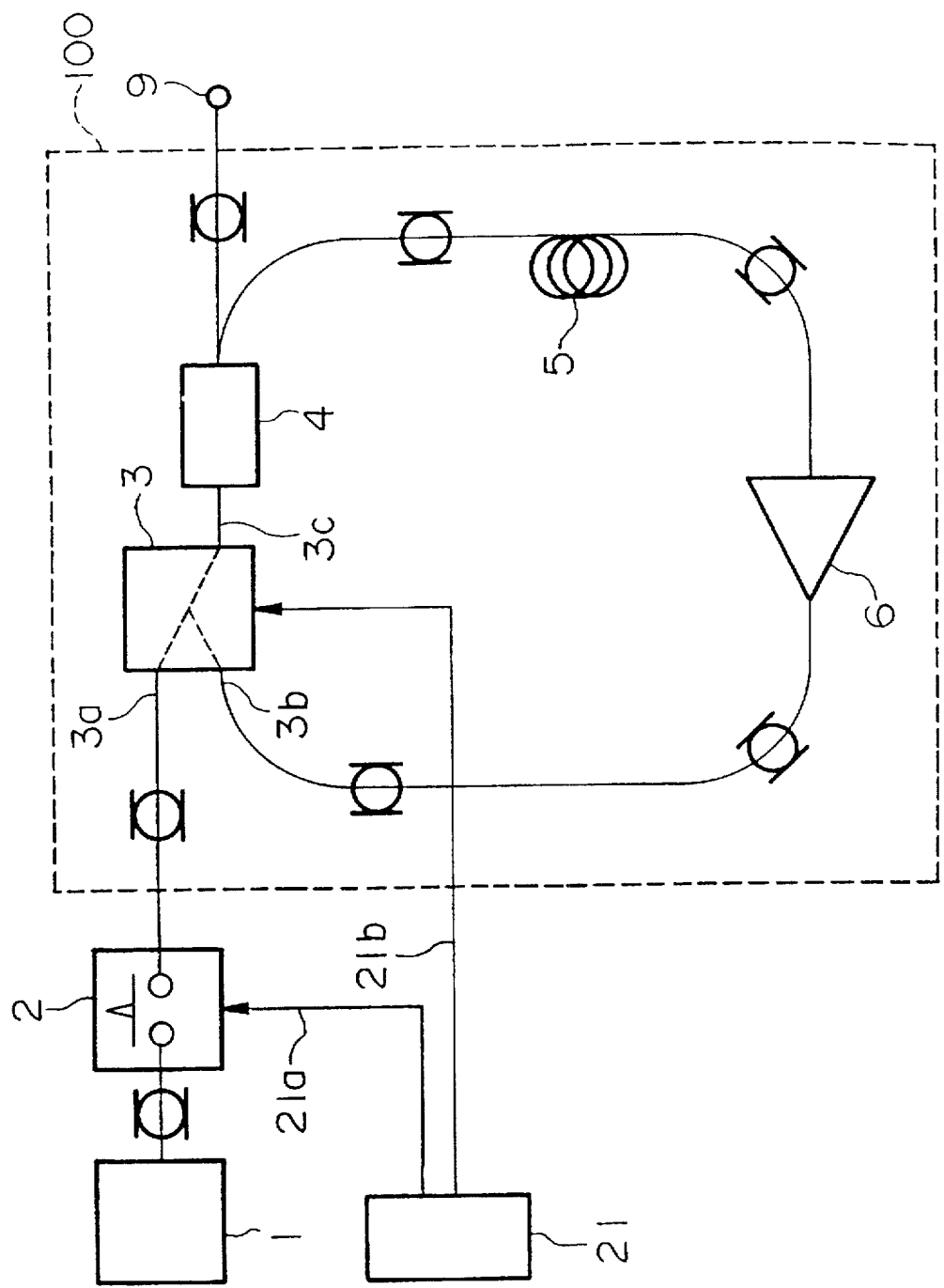
FIG. 16 is a block diagram showing an example of the structure of a conventional optical frequency sweep signal generator.

FIG. 1 is a block diagram showing the optical frequency sweep signal generator used in each embodiment according to the present invention. In the figure, reference numeral 100 is an optical loop circuit which has almost the same construction as optical loop circuit 100 in FIG. 16, and parts which are identical to those shown in FIG. 16 are given identical reference numerals, and an explanation thereof will be omitted here. A difference between optical loop circuit 100 of FIG. 1 and optical loop circuit 100 of FIG. 19 is that in the circuit of FIG. 1, optical frequency variable bandpass filter 7, which has a predetermined light-passing band and whose center frequency can be swept, is inserted into the loop, that is, located after optical amplifier 6 and before acousto-optical frequency shifter 3.

In FIG. 1, single-wavelength light source 1 and optical switch 2 are the same as those shown in FIG. 16, and single-wavelength light source 1 is optically connected to acousto-optical frequency shifter 3 of the optical loop circuit 100 via optical switch 2. Reference numeral 8 indicates an optical coupler having one-input and two-outputs, which is the same structure as optical coupler 4, and which splits light output from optical loop circuit 100. One of the split light portions from optical coupler 8 is output from optical output end 9. Next, reference numeral 10 indicates a light receiving element such as a photodiode, which receives the other light portion output form optical coupler 8 and outputs electric signal 10a in accordance with the received light.

Reference numeral 11 indicates a circulation control circuit which has all the functions provided for circulation control circuit 16 in FIG. 16, and has another function of outputting electric signal 11c in accordance with the received light. The electric signal 11c has, for example, logical value "1" (i.e., high voltage) from the start to the end of circulation, and has "0" (i.e., low voltage) within another period. Reference numeral 200 indicates a sweep signal analyzing circuit, which analyzes electric signal 10a with the input time of electric signal 11c as reference time and detects a difference between the center frequency of optical frequency variable bandpass filter 7 and the optical frequency of the pulsed light. The sweep signal analyzing circuit 200 outputs an electric signal for determining a set value which is contained in driving circuit 300 (described later) based on the detected result.

The driving circuit 300 outputs driving signal (electric signal) 300a for driving optical frequency variable bandpass

10 filter 7, based on electric signal 11c, which is input from optical loop circuit 11, and a set value, which is determined by sweep signal analyzing circuit 200.

Next, the function of the optical frequency sweep signal generator of the above structure will be explained. At the start of circulation, the continuous light from single-wavelength light source 1 is chopped and transformed into pulsed light, and the pulsed light is input into optical coupler 4 via acousto-optical frequency shifter 3. The pulsed light input into optical coupler 4 is split, and one of the split light portions is input into optical coupler 8, while the other split light portion is input into delay optical fiber 5. The pulsed light input into optical coupler 8 is further split, and one of the split light portions is output to the outside from optical output end 9 as an optical frequency sweep signal, and the other split light portion is input into light receiving element 10.

The pulsed light, which was directed to delay optical fiber 5 by optical coupler 4, is delayed by a predetermined time in delay optical fiber 5, and is then input into optical amplifier 6 to be optically amplified with a specific amplification level. The pulsed light output from optical amplifier 6 is input into optical frequency variable bandpass filter 7 with natural emission light which is simultaneously output.

Here, the control is performed such that the center frequency of optical frequency variable bandpass filter 7 agrees with the optical frequency of the pulsed light (the specific control method thereof will be later explained in detail). The optical signal which passed through and was output from optical frequency variable bandpass filter 7 consists of pulsed light and natural emission light which was limited within the passing band of optical frequency variable bandpass filter 7.

The pulsed light output from optical frequency variable bandpass filter 7 is input into acousto-optical frequency shifter 3. Here, the acousto-optical frequency shifter 3 has changed its connection form of optical waveguides such that optical waveguide 3c and optical waveguide 3b are connected to each other, by control signal 11b. When the pulsed light passes thorough the acousto-optical frequency shifter 3, the pulsed light is subjected to a specific frequency shift. The pulsed light output from acousto-optical frequency shifter 3 is input into optical coupler 4. The pulsed light continuously circulates along optical loop circuit 100 by repeating the above-explained operations.

The frequency of the pulsed light which circulates in the optical loop circuit 100 is shifted in acousto-optical frequency shifter 3 by a predetermined frequency for each circuit. A part of the pulsed light which circulates along optical loop circuit 100 is output, via optical coupler 4 and then optical coupler 9, from optical output end 9. The pulsed light output from optical output end 9 becomes a pulse train in which the frequency is shifted for each pulse.

At the end of circulation, circulation control circuit 11 cuts off control signal 11b. The acousto-optical frequency shifter 3, to which control signal 11b is not any longer applied, changes its switching form to the optical waveguide 3a side, thus optical loop circuit 100 is cut off. When optical loop circuit 100 is cut off, the pulsed light and the natural emission light, which remains in optical loop circuit 100, can no longer circulate and disappear. Therefore, the circulation operation is completed by cutting off the optical loop circuit 100 by acousto-optical frequency shifter 3.

Light receiving element 10 converts the optical frequency sweep signal output from optical coupler 8 into electric signal 10a, and inputs the converted signal into sweep signal analyzing circuit 200. The sweep signal analyzing circuit 200 detects the number of circuits of the pulsed light and the light intensity of the sweep light pulse train based on the electric signal 10a, and also detects the circulation start time based on electric signal 11c. The circuit 200 then analyzes electric signal 10a with the circulation start time as reference time, so as to detect an optical frequency difference between the center frequency of optical frequency variable bandpass filter 7 and the optical frequency of the pulsed light. The sweep signal analyzing circuit 200 changes the set value of driving circuit 300 based on the detected difference.

By repeating the above function (i.e., operations), an optical frequency sweep signal can be generated while compensating for the difference between the center frequency of optical frequency variable bandpass filter 7 and the optical frequency of the pulsed light.

Hereinbelow, the structures and functions of sweep signal analyzing circuit 200 and driving circuit 300 which are used in the optical frequency sweep signal generator in each embodiment according to the present invention will be explained with reference to FIGS. 2–15. Here, the output from driving circuit 300 in each embodiment is voltage output, and it is assumed that the center frequency of optical frequency variable bandpass filter 7 which is connected to the output of driving circuit 300 is linearly shifted in accordance with output voltage of driving circuit 300.

Figure 2:
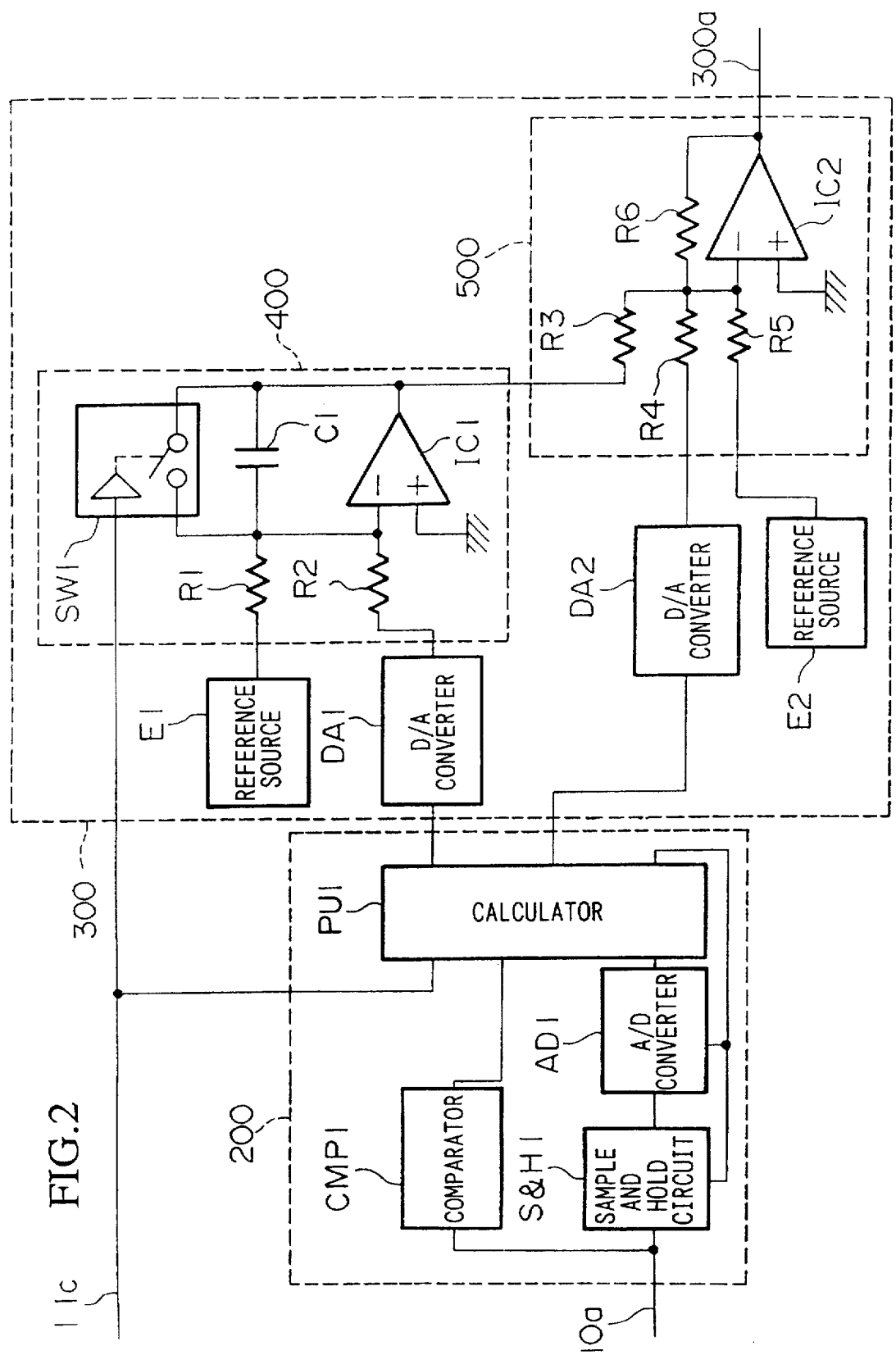
FIG. 2 is a block diagram showing the partial structure of the optical frequency sweep signal generator in the first embodiment according to the present invention.
Figure 12:
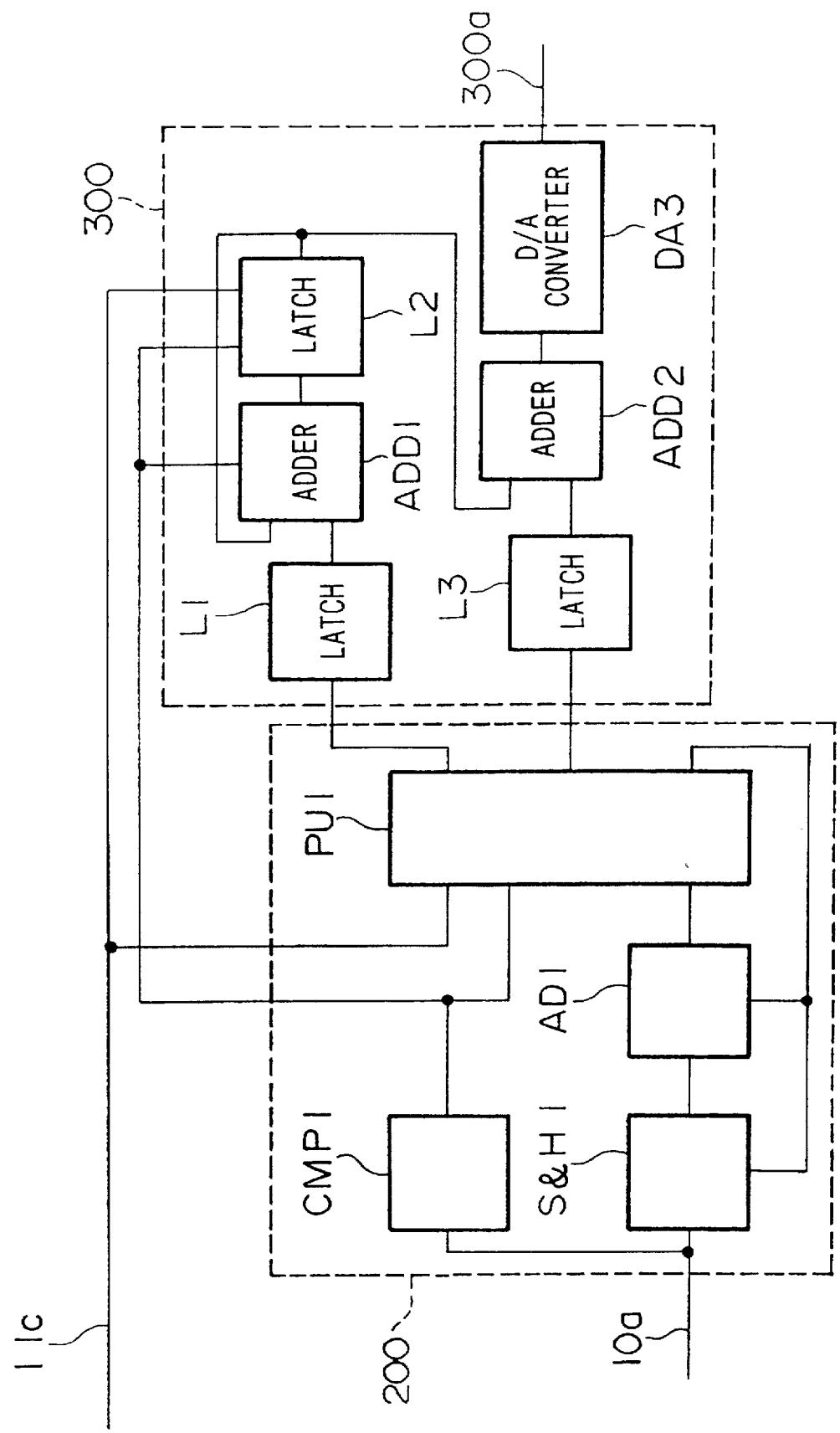
FIG. 12 is a block diagram showing the partial structure of the optical frequency sweep signal generator in the second embodiment according to the present invention.
Figure 15:
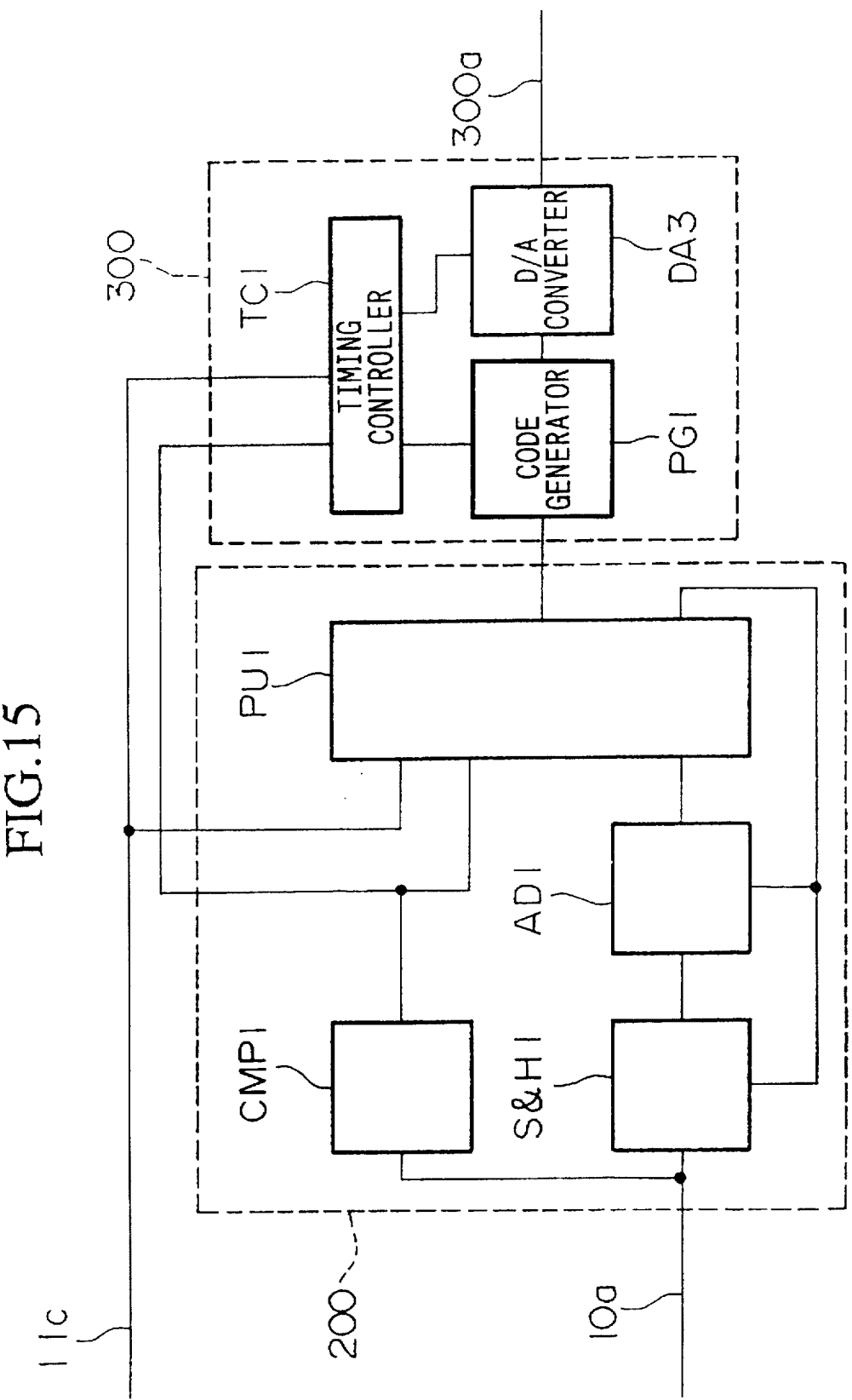
FIG. 15 is a block diagram showing the partial structure of the optical frequency sweep signal generator in the third embodiment according to the present invention.

Here, differences among each embodiment will be explained. The driving circuit 300 used in the optical frequency sweep signal generator according to the first embodiment as shown in FIG. 2, is a circuit used in cases in which the amount of the frequency shift of acousto-optical frequency shifter 3 is small in comparison with the band width of the optical frequency variable bandpass filter 7. On the other hand, in the driving circuit 300 used in the optical frequency sweep signal generator according to the second embodiment as shown in FIG. 12, the center frequency of optical frequency variable bandpass filter 7 can be shifted in step-form, and this arrangement is effective when the amount of the frequency shift of acousto-optical frequency shifter 3 is large, or optical frequency variable bandpass filter 7 with a narrow band is used. Furthermore, the driving circuit 300 used in the optical frequency sweep signal generator according to the third embodiment as shown in FIG. 15 resembles the driving circuit 300 used in the second embodiment; however, this circuit is effective in cases in which many adjustment points are necessary for approximating the shift of the center frequency (explained later) of the optical frequency variable bandpass filter to the frequency shift of the pulsed light by linear fragments.

In addition, the general construction as shown in FIG. 1 is common to each embodiment; thus, detail explanations for its operations will be omitted here. Furthermore, the construction of sweep signal analyzing circuit 200 is in generally, common to each embodiment; thus, all parts will be explained in the first embodiment, and in other embodiments, only those parts which are different will be explained.

First Embodiment

First, sweep signal analyzing circuit 200 and driving circuit 300, which are used in the optical frequency sweep signal generator according to the first embodiment of the present invention, will be explained with reference to FIG. 2. Immediately after activating the optical frequency sweep signal generator shown in FIG. 1, in sweep signal analyzing circuit 200, calculator PU1 assigns set values, which were previously stored in a storage device inside the calculator, to two D/A converters DA1 and DA2 in driving circuit 300.

Here, electric signal 11c from circulation control circuit 11 (refer to FIG. 1) has logical value "1" (i.e., high voltage) at the start of circulation, and maintains the logical value "1" until the circulation is completed; and the signal 11c has logical value "0" (i.e., low voltage) at the end of circulation, and maintains the logical value "0" until the start of next circulation. At the start of circulation, when electric signal 11c has logical value "1" and analog switch SW1 goes into an "off" state in driving circuit 300, capacitor C1, which is a construction element of integrator 400, becomes chargeable. Accordingly, integrator 400 starts an integral operation in accordance with voltages output from reference source E1 and D/A converter DA1. The output from integrator 400 is input into adder 500. The adder 500 adds outputs of reference source E2, D/A converter DA2, and integrator 400, and outputs driving signal 300a for driving optical frequency variable bandpass filter 7 (refer to FIG. 1).

Figure 3:
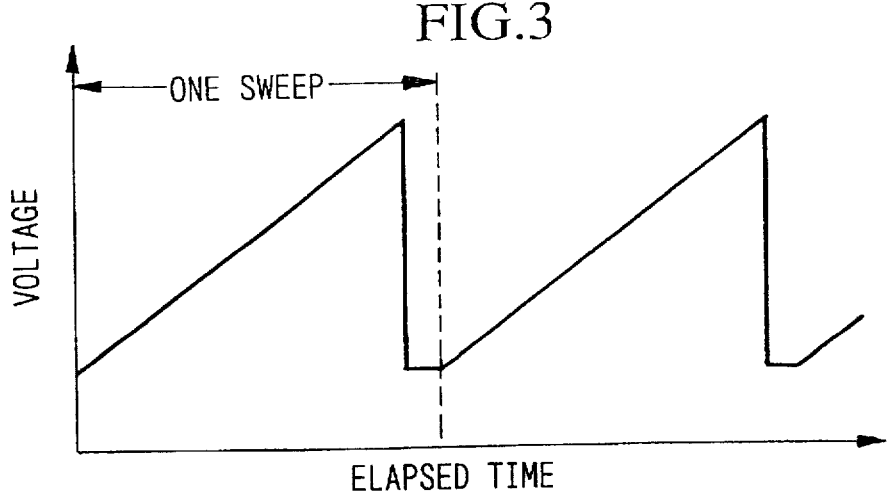
FIG. 3 is a diagram showing an example of the waveform of driving signal 300a used in the generator.

FIG. 3 shows an example of driving signal 300a. In FIG. 3, the horizontal axis indicates the elapsed time from the start of the sweep operation, while the vertical axis indicates the voltage of driving signal 300a. The driving signal 300a is swept so as to adjust the center frequency of optical frequency variable bandpass filter 7 to the frequency shift of the pulsed light.

When electric signal 11c has logical value "0" at the end of circulation and analog switch SW1 goes into an "off" state, the charge which has been stored in capacitor C1 is discharged, and the output of integrator 400 becomes "0". When the output of integrator 400 becomes "0", the voltage of driving signal 300a, which is thus output from adder 500, becomes the sum of outputs from reference source E2 and D/A converter DA2. When driving signal 300a becomes the summation voltage of outputs from reference source E2 and D/A converter DA2, the center frequency of optical frequency variable bandpass filter 7 (refer to FIG. 1) becomes the optical frequency at the time of the start of the circulation.

On the other hand, two D/A converters DA1 and DA2 perform fine adjustment with respect to a waveform shown in FIG. 3. By performing such fine adjustment for the waveform shown in FIG. 3, it is possible to tune the optical frequency (which shifts) of the pulsed light to the center frequency of optical frequency variable bandpass filter 7 (refer to FIG. 1). Additionally, it is also possible to correct temperature drift, and inferior long-term stability and repeatability with respect to optical frequency variable bandpass filter 7. Hereinbelow, operations performed by sweep signal analyzing circuit 200 for finely adjusting the waveform shown in FIG. 3 by using two D/A converters DA1 and DA2 in driving circuit 300 will be explained.

In sweep signal analyzing circuit 200, comparator CMP1 converts electric signal 10a (which was obtained by converting the intensity of the optical frequency sweep signal) into a logical signal pulse train which has time information of the light pulse train of the optical frequency sweep signal. The logical signal pulse train output from comparator CMP1 is input into calculator PU1. The calculator PU1 detects the rise when input electric signal 11c becomes logical value "1" at the start of circulation, so as to detect the start time of the sweep. The calculator PU1 also calculates appearance time with respect to the number of a circuit to be selected, based on electric signal 11c, which is a logical signal indicating the start of circulation, and the logical signal pulse train input from comparator CMP1.

The calculator PU1 outputs a logical signal to sample and hold circuit S&H1 at the appearance time of the number of the circuit to be selected. The sample and hold circuit S&H1 maintains the voltage of electric signal 10a, and the voltage maintained by this sample and hold circuit S&H1 is converted into a logical signal by A/D converter AD1 to be input into calculator PU1. That is, the sample and hold circuit S&H1 has a function of maintaining the voltage of electric signal 10a of time (to be selected) only during the conversion period of A/D converter AD1.

Here, operations of sweep signal analyzing circuit 200 for detecting a difference between the optical frequency of the pulsed light at the start of the sweep and the center frequency of optical frequency variable bandpass filter 7 (refer to FIG. 1) will be explained. First, calculator PU1 selects the pulsed light after one-circuit of the circulation, that is, selects the "second" pulsed light from the start of the sweep. The reason for ignoring the "first" pulsed light is, as described above, that the "first" pulsed light is output without passing through optical frequency variable bandpass filter 7.

At the start of circulation, optical frequency variable bandpass filter 7 starts the sweep operation by using driving signal 300a. In addition, while the pulsed light is passing through the optical frequency variable bandpass filter 7, the center frequency of optical frequency variable bandpass filter 7 also changes and the passing loss of the optical frequency variable bandpass filter 7 at the optical frequency of the pulsed light is also shifted. Therefore, the intensity of the pulsed light at the output of optical frequency variable bandpass filter 7 is also shifted.

Figure 4:
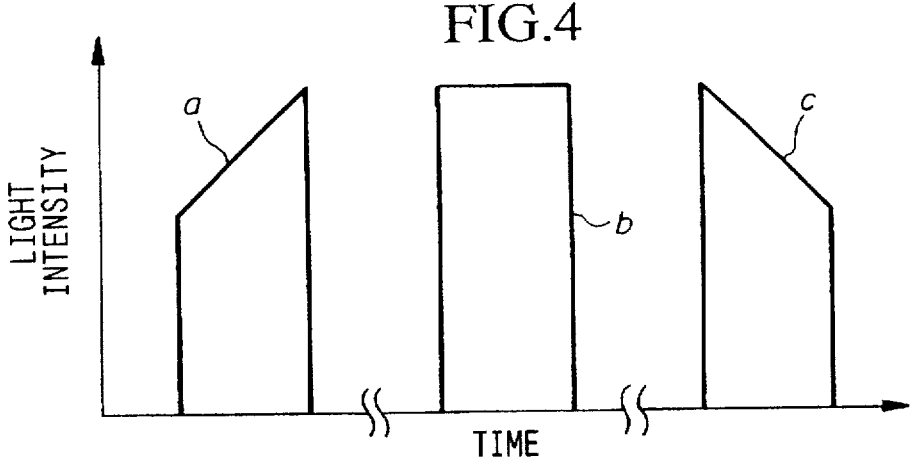
FIG. 4 is a diagram showing an example of the shift of the light intensity of the pulsed light due to a difference between the optical frequency of the pulsed light and the center frequency of optical frequency variable bandpass filter 7 in the generator.

FIG. 4 shows the shift of light intensity relating to the difference between the center frequency of optical frequency variable bandpass filter 7 and the optical frequency of the pulsed light. In FIG. 4, the horizontal axis indicates time, while vertical axis indicates light intensity of the pulsed light.

In FIG. 4, pulsed light a is obtained when the center frequency of optical frequency variable bandpass filter 7 is lower than the optical frequency of the pulsed light, and the optical frequency gradually approaches the center frequency of optical frequency variable bandpass filter 7. That is, in this case, the passing loss of the pulsed light gradually decreases, and thus the light intensity is gradually increased.

Also in FIG. 4, pulsed light b is obtained when the center frequency of optical frequency variable bandpass filter 7 approximately agrees with the optical frequency of the pulsed light, and the optical frequency lies at the part of the center frequency, where the passing loss due to optical frequency variable bandpass filter 7 varies a little. In this case, the pulsed light is not subjected to the variation of the passing loss due to optical frequency variable bandpass filter 7; thus, the light intensity thereof is not changed.

Also in FIG. 4, pulsed light c is obtained when the center frequency of optical frequency variable bandpass filter 7 is higher than the optical frequency of the pulsed light, and the optical frequency gradually recedes from the center frequency of optical frequency variable bandpass filter 7. That is, in this case, the pulsed light is gradually subjected to the passing loss of optical frequency variable bandpass filter 7, and thus the light intensity thereof is gradually decreased.

As described above, it is possible to detect a difference between the center frequency of optical frequency variable bandpass filter 7 and the optical frequency of the pulsed light, based on the shift of the light intensity of the pulsed light.

The calculator PU1 acquires voltages at immediately after the rise of and at immediately before the fall of the second pulse of electric signal 10a via sample and hold circuit S&H1 from A/D converter AD1. If the voltages cannot be acquired at the same time because of a long conversion time of A/D converter AD1, the voltages at immediately after the rise of and at immediately before the fall of the second pulse of electric signal 10a may be acquired by separate sweep operations.

The calculator PU1 compares the voltages at immediately after the rise of and at immediately before the fall of the second pulse of electric signal 10a, which were acquired from A/D converter AD1, and calculates the direction and the amount of detuning between the center frequency of optical frequency variable bandpass filter 7 and the optical frequency of the pulsed light. The calculator PU1 changes the set value of D/A converter DA2 in accordance with the direction and the amount of detuning between the center frequency of optical frequency variable bandpass filter 7 and the optical frequency of the pulsed light. By repeating the above operations, it is possible to continuously tune the optical frequency of the pulsed light at the start of the sweep to the center frequency of optical frequency variable bandpass filter 7 (refer to FIG. 1).

Figure 5:
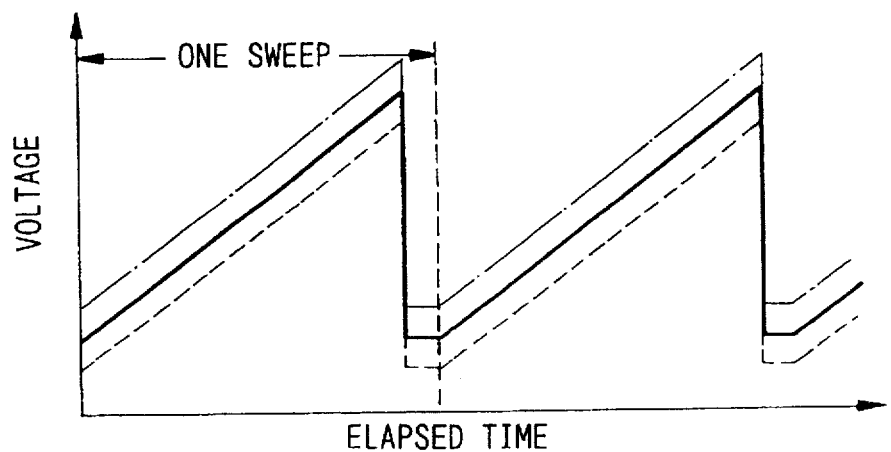
FIG. 5 is a diagram showing an example of the shift of driving signal 300a due to the operation by D/A converter DA2 in the generator.

FIG. 5 shows the shift of the waveform of driving signal 300a when the set value of D/A converter DA2 is changed. In FIG. 5, the horizontal axis indicates the elapsed time from the start of the sweep, while the vertical axis indicates the voltage of driving signal 300a. The dotted line and the alternating long and short dash line in FIG. 5 indicate examples of the waveform of driving signal 300a when the set value of D/A converter DA2 is changed. By using the method of determining the direction and the amount of detuning between the center frequency of optical frequency variable bandpass filter 7 and the optical frequency of the pulsed light by using the distortion of the waveform of the pulsed light, it is possible to rapidly adjust the optical frequency of the pulsed light at the start of the sweep and the center frequency of optical frequency variable bandpass filter 7.

Figure 6:
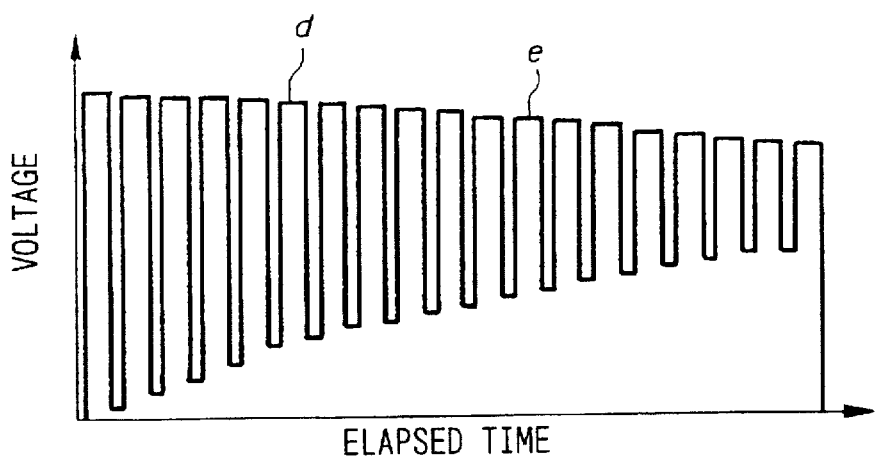
FIG. 6 is a diagram showing an example of the waveform of electric signal 10a in the generator.

Next, operations for matching the shift speed of the optical frequency according to the optical frequency shift of the pulsed light with the shift speed of the center frequency of optical frequency variable bandpass filter 7 will be explained. FIG. 6 shows an example of the waveform of electric signal 10a. In FIG. 6, the horizontal axis indicates the elapsed time from the start of the sweep, while the vertical axis indicates the voltage of electric signal 10a. FIG. 6 typically indicates the waveform of electric signal 10a of one sweep, that is, from the start of the sweep to the start of the next sweep. The actual electric signal 10a is a pulse train made by a few thousand circuits of circulation. Here, a case in which the shift speed of the optical frequency according to the optical frequency shift of the pulsed light is matched with the shift speed of the center frequency of optical frequency variable bandpass filter 7 by using the pulse at point d in FIG. 6 will be explained.

Figure 7:
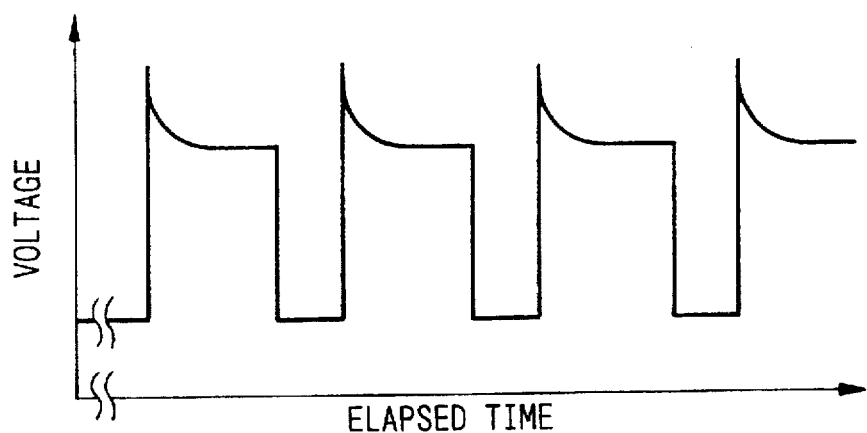
FIG. 7 is a diagram showing an example of the enlarged view of the waveform of electric signal 10a in the generator.

FIG. 7 shows an example of an enlarged view of the waveform of the pulse at point d in FIG. 6. The reason for distortion of the waveform of pulses as shown in FIG. 7 is due to the optical amplification function of the optical amplifier. However, this point does not relate to the main subject of the present invention; thus, an explanation thereof will be omitted here. Since the pulse waveform is distorted as shown in FIG. 7, the method in which the direction and the amount of detuning are defined by using the difference between the light intensities at immediately after the rise of and at immediately before the fall of the light pulse, as described above, cannot be applied to this case.

The calculator PU1 in FIG. 2 detects the time of appearance of the pulse at point d (refer to FIG. 6) by counting pulses in the logical signal pulse train from comparator CMP1, with the time of the rise in the logical signal of electric signal 11c as the start time of the counting. The calculator PU1 inputs logical signals into sample and hold circuit S&H1 and A/D converter AD1, and acquires the voltage of the pulse at point d. Next, the calculator PU1 changes the set value of D/A converter DA1. The calculator PU1 outputs logical signals into sample and hold circuit S&H1 and A/D converter AD1 on and after the sweep next to the sweep in which the set value of D/A converter DA1 was changed, and acquires the voltage of the pulse at point d so as to compare it with the former-acquired voltage value.

Figure 8:
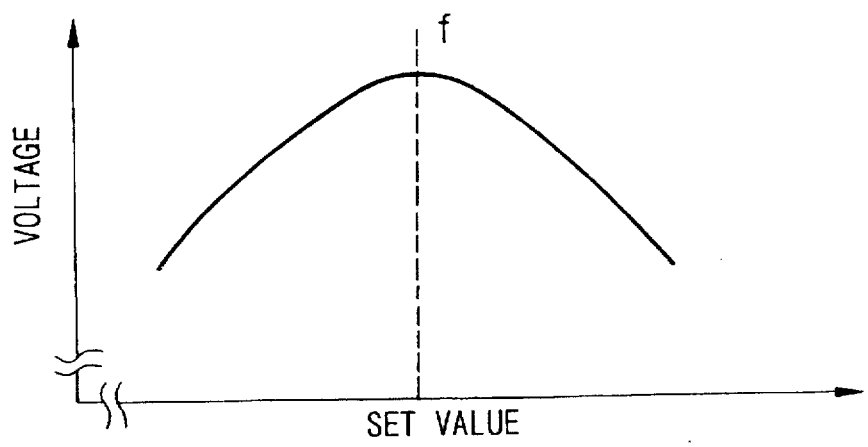
FIG. 8 is a diagram showing an example of the shift of the voltage of the pulse at point d for a case in which the set value for D/A converter DA1 in the generator is changed.

FIG. 8 shows a relationship between the set value of D/A converter DA1 and the voltage of the pulse at point d (refer to FIG. 6). In FIG. 8, the horizontal axis indicates the set value of D/A converter DA1, while the vertical axis indicates the voltage of the pulse at point d. As shown in FIG. 8, there is a set value f for D/A converter DA1 at which the voltage of the pulse at point d becomes maximum. The calculator PU1 repeats the above operations, and detects the above set value f. By assigning set value f to D/A converter DA1, it is possible to match the shift of the optical frequency according to the frequency shift of the pulsed light to the shift of the center frequency of optical frequency variable bandpass filter 7 within the range from the start of the sweep to point d.

Figure 9:
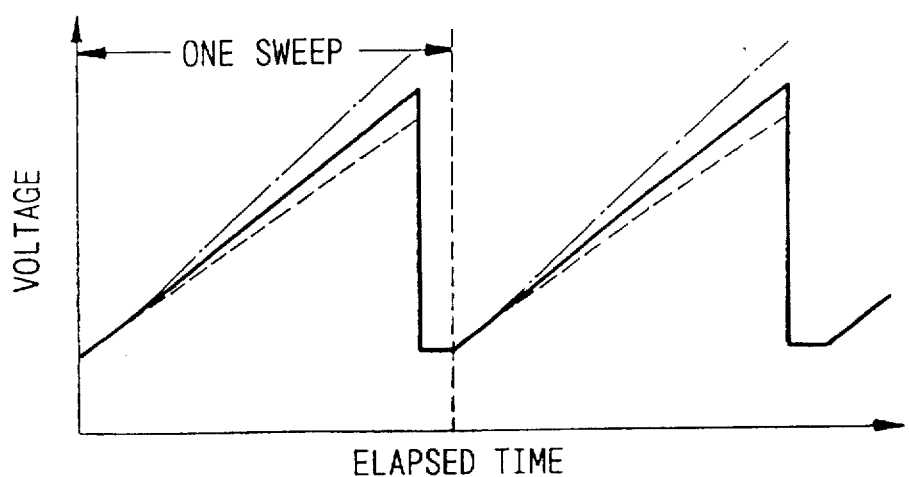
FIG. 9 is a diagram showing an example of the shift of driving signal 300a for a case in which the set value for D/A converter DA1 in the generator is changed.

FIG. 9 shows the shift of the waveform of driving signal 300a in the case of changing the set value of D/A converter DA1. In FIG. 9, the horizontal axis indicates the elapsed time from the start of the sweep, and the vertical axis indicates the voltage of driving signal 300a. The dotted line and the alternating long and short dash line in FIG. 9 indicate examples of the waveform of driving signal 300a when the set value of D/A converter DA1 is changed.

As described above, when the relationship between the shift of the center frequency of optical frequency variable bandpass filter 7 (refer to FIG. 1) and the driving voltage 300a is linear, the optical frequency of the pulsed light from the start to the end of the sweep and the center frequency of optical frequency variable bandpass filter 7 can be tuned to each other by using the above operations.

However, if the linearity of the shift of the center frequency of optical frequency variable bandpass filter 7 versus driving voltage 300a is undesirable, the tuned state becomes untuned at and after point d; thus, the pulsed light becomes rapidly attenuated and disappears. Therefore, the set value of D/A converter DA1 is changed at point d. In this way, it is possible to compensate for the change caused by the non-linearity of the shift speed of the center frequency of optical frequency variable bandpass filter 7.

Specifically, calculator PU1 inputs logical signals into sample and hold circuit addition, at the start of the sweep, the calculator PU1 performs the above-described operations to assign a set value to D/A converter DA1.

The calculator PU1 changes the set value of D/A converter DA1 at the time of appearance of the pulse at point d, by using a method explained later. The calculator PU1 inputs logical signals into sample and hold circuit S&H1 and A/D converter AD1 so as to acquire voltage at point e, and compares it with the former acquired voltage. Here, the relationship between the set value of D/A converter DA1 which was changed at point d and the voltage of the pulse at point e is the same as that shown in FIG. 8. Therefore, the calculator PU1 can detect the set value which maximizes the voltage of the pulse at point e. Accordingly, by assigning the set value for maximizing the voltage of the pulse at point e to D/A converter DA1, the optical frequencies from point d to point e and the center frequency of optical frequency variable bandpass filter 7 can be tuned to each other.

Figure 10:
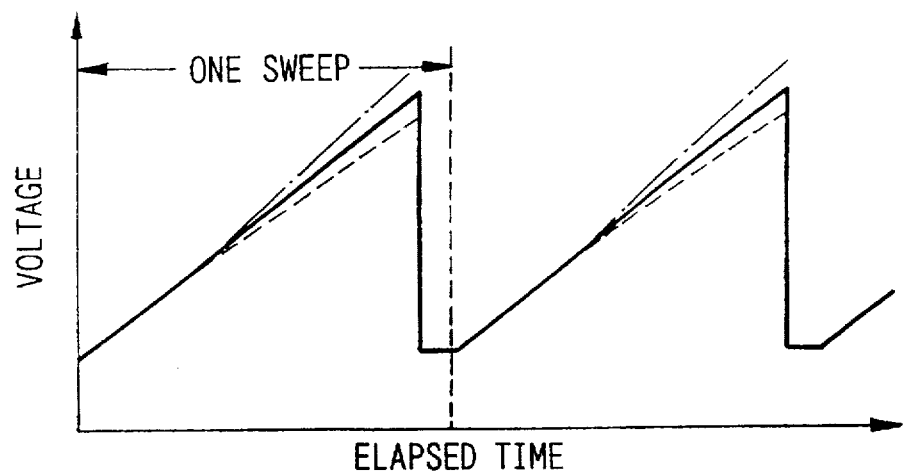
FIG. 10 is a diagram showing an example of the shift of driving signal 300a for a case in which the set value for D/A converter DA1 in the generator is changed.

FIG. 10 shows the change of waveform of driving signal 300a in the case in which the set value of D/A converter DA1 is changed at point d. In FIG. 10, the horizontal axis indicates the elapsed time from the start of the sweep, while the vertical axis indicates the voltage of driving signal 300a. The dotted line and the alternating long and short dash line in FIG. 10 indicate examples of the waveform of driving signal 300a when the set value of D/A converter DA1 is changed.

If the linearity of the shift of the center frequency of optical frequency variable bandpass filter 7 versus driving voltage 300a is undesirable, plural adjustment points are defined in one sweep, as shown in FIG. 6. The calculator PU1 changes the set value of D/A converter DA1 at each adjustment point. By changing the set value of D/A converter DA1, the non-linearity of the relationship between the change of the center frequency of optical frequency variable bandpass filter 7 and driving voltage 300a can be corrected by approximation using linear fragments. According to this correction, the optical frequency of the pulsed light and the center frequency of optical frequency variable bandpass filter 7 can be tuned to each other over the whole range of the optical sweep frequencies.

As clearly shown by the above explanation, any response speed of optical frequency variable bandpass filter 7 may be enough so long as it can follow the sweep speed of the optical frequency sweep signal. For each of two D/A converters DA1 and DA2, a variable range for only fine adjustment of the driving signal is required; thus, converters with low resolution can be used. Therefore, sweep signal analyzing circuit 200 and driving circuit 300 for constructing the optical frequency sweep signal generator according to the first embodiment can be constructed by using relatively cheep and general parts. Accordingly, an optical frequency sweep signal generator which has sufficient properties and which is excellent in cost performance ratio can be provided.

Second Embodiment

Hereinbelow, driving circuit 300 used for optical frequency sweep signal generator according to the second embodiment of the present invention will be explained with reference to FIG. 12. If the band width of optical frequency variable bandpass filter 7 as shown in FIG. 1 is narrow, in the optical frequency sweep signal generator according to the first embodiment, pulsed light enters in the block area of the optical frequency variable bandpass filter 7, as shown in FIG. 11.

Figure 11:
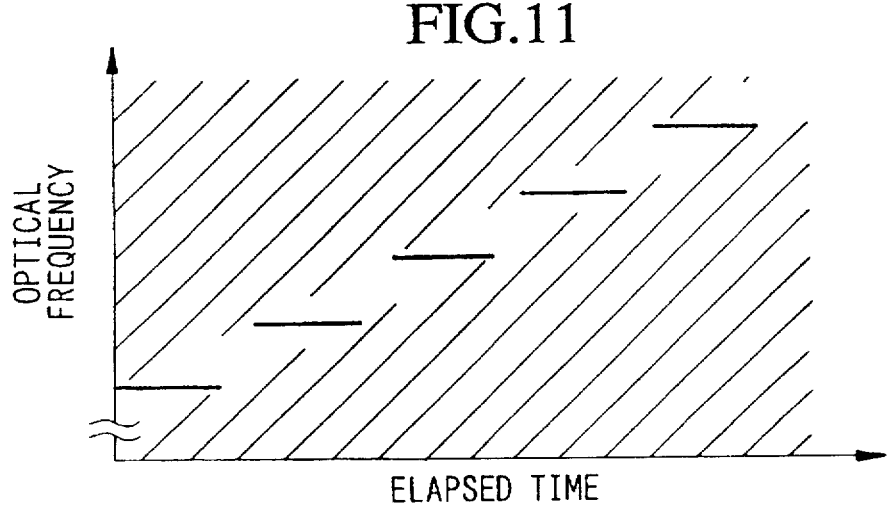
FIG. 11 is a diagram showing a relationship between the optical frequency of the pulsed light and the center frequency of optical frequency variable bandpass filter 7 for a case in which the band width of optical frequency variable bandpass filter 7 is narrow in the generator.
Figure 17:
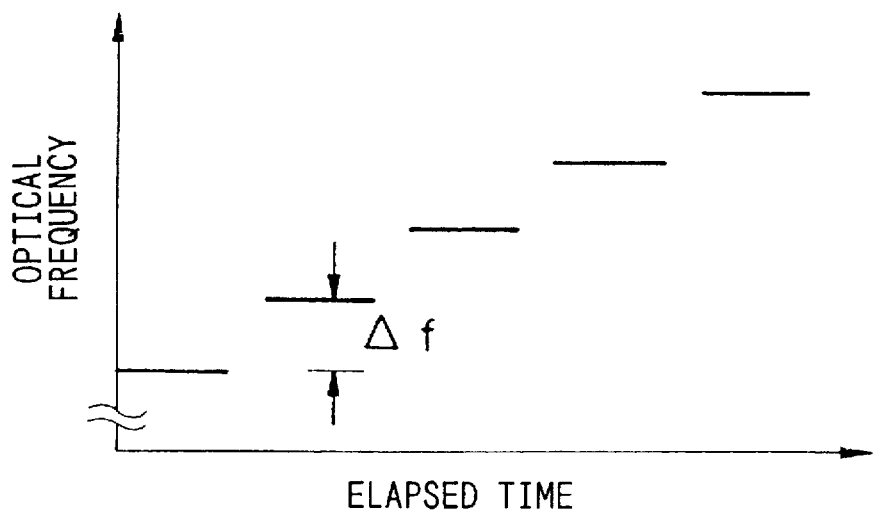
FIG. 17 is a diagram showing a relationship between the time of the optical frequency sweep output and the optical frequency of the pulsed light.

FIG. 11 has nearly the same format as FIG. 17, and shows a variation of the passing and block areas of optical frequency variable bandpass filter 7 for a case in which optical frequency variable bandpass filter 7 with narrow band is driven by driving circuit 300 as shown in FIG. 2. In FIG. 11, the hatched parts indicate the block areas of optical frequency variable bandpass filter 7, where large light-passing loss occurs. On the other hand, the part which is not hatched indicates the passing area, where small light-passing loss occurs.

Figure 13:
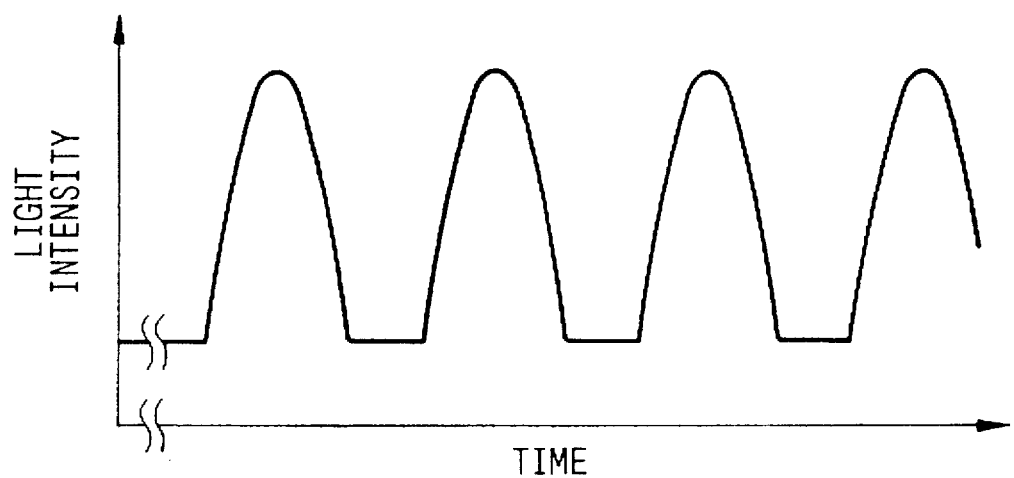
FIG. 13 is a diagram showing an example of the waveform of the pulsed light for a case in which the band width of optical frequency variable bandpass filter 7 is narrow in the optical frequency sweep signal generator according to the first embodiment.

When the pulsed light enters the block area of optical frequency variable bandpass filter 7 as shown in FIG. 11, the waveform of the pulses is deformed as shown in FIG. 13. In FIG. 13, the horizontal axis indicates time, while the vertical axis indicates the light intensity of the circulation signal. If the waveform of the pulses are deformed as shown in FIG. 13, time for acquiring information with respect to the optical frequency from the optical frequency sweep signal becomes shorter.

Figure 14:
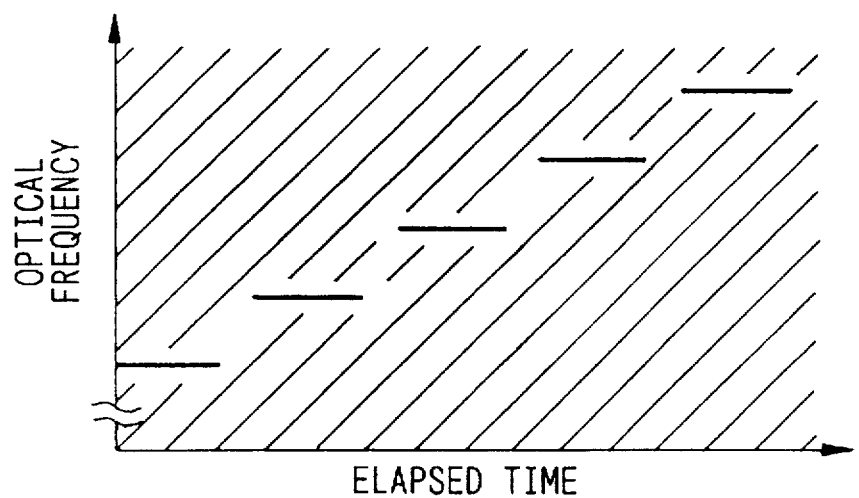
FIG. 14 is a diagram for explaining a method for sweeping the center frequency of optical frequency variable bandpass filter 7 for a case in which the band width of optical frequency variable bandpass filter 7 is narrow in the optical frequency sweep signal generator according to the second and third embodiments.

Therefore, the center frequency of optical frequency variable bandpass filter 7 is shifted in step-form as shown in FIG. 14. This is the point of the second embodiment. In FIG. 14, the horizontal axis indicates the elapsed time from the start of the sweep, while the vertical axis indicates the optical frequency. In FIG. 14, the hatched parts indicate the block areas of optical frequency variable bandpass filter 7, where large light-passing loss occurs. On the other hand, parts which are not hatched indicate the passing areas, where small light-passing loss occurs.

Hereinbelow, the difference of driving circuit 300 shown in FIG. 12 in comparison with driving circuit 300 shown in FIG. 2 will be explained. In the driving circuit 300 in FIG. 12, the output of comparator CMP1 in the sweep signal analyzing circuit 200 is connected to adder ADD1 and latch L2. On the other hand, the output of calculator PU1 in the sweep signal analyzing circuit 200 is connected to latches L1 and L3. Furthermore, control signal 11c is input into latch L2, and functions so as to clear latch L2 from the end to the next start of circulation.

Immediately after activating the optical frequency sweep signal generator in FIG. 1, calculator PU1 assigns pre-stored set values to two latches L1 and L3. The adder ADD1 adds the set values of the latches L1 and L2 for each received pulse from comparator CMP1, and outputs the added result to latch L2. The latch L2 latches the output from adder ADD1 in accordance to the fall in the pulse output from comparator CMP1. The adder ADD1 and latch L2 accumulate the set value of latch L1 for each pulse from comparator CMP1. This operation can be regarded as a state in which the output of integrator 400 (refer to FIG. 2) increases with step-form. Here, latch L1 corresponds to a combination of reference source E1 and D/A converter DA1 in FIG. 2.

The output of adder ADD2 which adds the values of latches L2 and L3 is converted in D/A converter DA3 into driving signal 300a of optical frequency variable bandpass filter 7. That is, adder ADD2 and D/A converter DA3 corresponds to adder 500 (refer to FIG. 2). The driving signal 300a changes the passing areas of optical frequency variable bandpass filter 7, as shown in FIG. 14.

Next, operations of sweep signal analyzing circuit 200 for detecting a difference between the optical frequency of the pulsed light at the start of the sweep and the center frequency of the optical frequency variable bandpass filter 7. The calculator PU1 selects the second pulse from the start of the sweep, as explained in the first embodiment. However, as shown in FIG. 14, while the pulsed light passes optical frequency variable bandpass filter 7, the center frequency of optical frequency variable bandpass filter 7 is unchanged and hence the light intensity of the pulsed light is also unchanged. Therefore, it is impossible to apply the method in which the direction and the amount of detuning are detected by using the difference between light intensities at immediately after the rise of and at immediately before the fall of the pulsed light.

Therefore, in order to tune the optical frequency of the second pulsed light from the start of the sweep and the center frequency of optical frequency variable bandpass filter 7 to each other, the sweep signal analyzing circuit 200 in FIG. 12 performs the operation in which the center frequency of optical frequency variable bandpass filter 7 is shifted so as to calculate set value f (refer to FIG. 8) by which the intensity of the second pulsed light (from the start of the sweep) becomes maximum, as described above. The calculator PU1 acquires set value f by changing the set value for latch L3 and by shifting driving signal 300a as shown in FIG. 5.

The calculator PU1 performs a tuning operation with respect to point d (refer to FIG. 6). This tuning operation at point d is such that, as described above, the center frequency of optical frequency variable bandpass filter 7 is shifted; set value f for maximizing the light intensity at point d in FIG. 6 is defined; and the set value of latch L3 is changed, whereby driving signal 300a is shifted as shown by the dotted line and the alternating long and short dash line in FIG. 9. According to this operation, in the range from the start of the sweep to point d, the shift of the optical frequency according to the frequency shift of the pulsed light and the shift of the center frequency of optical frequency variable bandpass filter 7 can be tuned to each other.

In addition, calculator PU1 performs operations similar to those performed in the first embodiment within the section between points d and e. The calculator PU1 performs the tuning operation at some adjustment points defined in one sweep range. In this way, by performing the tuning operation at all the decided adjustment points, the optical frequency of the pulsed light and the center frequency of optical frequency variable bandpass filter 7 can be tuned to each other within the whole sweep range.

As explained above, according to the optical frequency sweep signal generator of the second embodiment, it is possible to shift the center frequency of optical frequency variable bandpass filter 7 in step-form. Therefore, this arrangement is preferable when using an optical frequency variable bandpass filter with a narrow band, or when generating an optical frequency sweep signal by which the amount of the shift of the optical frequency shift is large for each circuit. Therefore, the optical frequency sweep signal generator according to the second embodiment is preferable for cases in which optical frequency sweep properties superior to those of the first embodiment are required.

Third Embodiment

Hereinbelow, driving circuit 300 used for the optical frequency sweep signal generator of the third embodiment according to the present invention will be explained with reference to FIG. 15. Here, sweep signal analyzing circuit 200 shown in FIG. 15 has the same structure as that shown in FIG. 12.

The output of comparator CMP1 in sweep signal analyzing circuit 200 in FIG. 15 is connected to timing controller TC1. On the other hand, the output of calculator PU1 in the sweep signal analyzing circuit 200 is connected to code generator PG1.

Immediately after activating the optical frequency sweep signal generator, calculator PU1 assigns a previously-defined code sequence to code generator PG1. The timing controller TC1 operates the code generator PG1 in synchronism with the pulse train output from comparator CMP1, and causes the generator to output the defined code sequence to D/A converter DA3. In addition, since timing controller TC1 is reset by electric signal 11c, code generator PG1 generates the same code sequence for each sweep. The D/A converter DA3 converts the code sequence into driving signal 300a and inputs it into optical frequency variable bandpass filter 7. Therefore, driving signal 300a becomes step-formed in synchronism with the optical frequency sweep signal. This driving signal 300a changes the passing areas of optical frequency variable bandpass filter, as shown in FIG. 14.

In optical frequency sweep signal generator according to the third embodiment, the tuning operation between the optical frequency of the pulsed light and the center frequency of optical frequency variable bandpass filter 7 is the same as that performed in the second embodiment.

The calculator PU1 adds a difference between set value f, which was obtained by the tuning operation at the start of the sweep, and the former set value to each code sequence assigned to the code generator. The code sequence after the add operation is assigned to the code generator PG1. In this way, driving signal 300a can be shifted as shown in FIG. 5. Accordingly, it is possible to tune the optical frequency at the start of the sweep and the center frequency of optical frequency variable bandpass filter 7 to each other.

The calculator PU1 performs the tuning operation at point d (refer to FIG. 6), in the same way as that performed in the second embodiment.

The calculator PU1 performs linear interpolation with respect to the set value at the start of the sweep and the set value of point d for each change of the set value at point d, and assigns the set value obtained by the interpolation for the code sequences corresponding to the range from the start of the sweep to point d. According to the above operations, driving signal 300a can be shifted, as shown by the dotted line and the alternating long and short dash line in FIG. 9. After the tuning operation at point d, the calculator PU1 performs the following operation. The calculator PU1 adds the difference between set value f, which was obtained by the tuning operation at point d, and the former set value at point d to all code sequences assigned to the code generator at and after point d. This operation is performed in order that the set values from the start of the sweep to point d and the set values after point d are approximately coupled by linear fragments.

The calculator PU1 performs the same operation as the tuning operation explained in the first and second embodiments in the section from point d to point e. In addition, the calculator PU1 performs the tuning operation at all of the adjustment points decided in one sweep range, whereby it is possible to tune the optical frequency of the pulsed light and the center frequency of optical frequency variable bandpass filter 7 (in FIG. 1) over the whole sweep range.

As explained above, in the optical frequency sweep signal generator of the third embodiment, as is in the second embodiment, the center frequency of optical frequency variable bandpass filter 7 can be shifted in step-form, and this embodiment is particularly effective in cases in which many adjustment points for the slope of the driving signal are necessary in the sweep range.

What is claimed is:
1. An optical frequency sweep signal generator comprising:
a circulation control circuit for generating a first electric signal which indicates the start and the end of a sweep;
an optical switch for converting continuous light output from a single-wavelength light source into pulsed light based on the first electric signal;
an optical loop circuit having an optical loop path along which the pulsed light circulates;
an acousto-optical frequency shifter, inserted in the optical loop path, for introducing the pulsed light into the optical loop path and for shifting the optical frequency of the pulsed light which circulates along the optical loop path by a predetermined optical frequency, based on the first electric signal;
first light branch means, inserted in the optical loop path, for splitting the pulsed light which circulates along the optical loop path and for outputting one of the split pulsed light to the outside of the optical loop circuit;
a delay optical fiber, inserted in the optical loop path, for delaying the other of said split pulsed light output from the first light branch means so as to adjust a circulation time of the pulsed light;
an optical amplifier, inserted in the optical loop path, for amplifying light which circulates along the optical loop path, the light including natural emission light, so as to compensate for circulation loss;
an optical frequency variable bandpass filter for suppressing circulation of the natural emission light output from the optical amplifier;
second light branch means for splitting said one of the split pulsed light output from the first light branch means;
an optical output end for outputting one of the split pulsed light output from the second light branch means as an optical frequency sweep signal;
a light receiving element for converting the other of the split pulsed light output from the second light branch means into a second electric signal, and for outputting the converted signal;
a sweep signal analyzing circuit for detecting a difference between the center frequency of the optical frequency variable bandpass filter and the optical frequency of the pulsed light which circulates along the optical loop path based on the first and second electric signals, and for outputting a set value for compensating for the difference; and
a driving circuit for supplying a driving signal for determining the center frequency of the optical frequency variable bandpass filter to the optical frequency variable bandpass filter, based on the first electric signal and the set value.

* * * * *

UNITED STATES PATENT AND TRADEMARK OFFICE
CERTIFICATE OF CORRECTION

PATENT NO.   : 5,786,930
DATED        : July 28, 1998
INVENTOR(S)  : Tatsuhiko TAKATSU et al.

It is certified that error appears in the above-identified patent and that said Letters Patent is hereby corrected as shown below:

On the title page, item

[75] Inventors, "Miura-gun," should read --Yonezawa-shi,--.

Signed and Sealed this

Eleventh Day of May, 1999

Attest:

Q. TODD DICKINSON

*Attesting Officer*      *Acting Commissioner of Patents and Trademarks*